April 28, 1931. J. PAPROTH 1,802,670
LEVEL INDICATOR FOR LIQUID TANKS
Filed Sept. 18, 1926
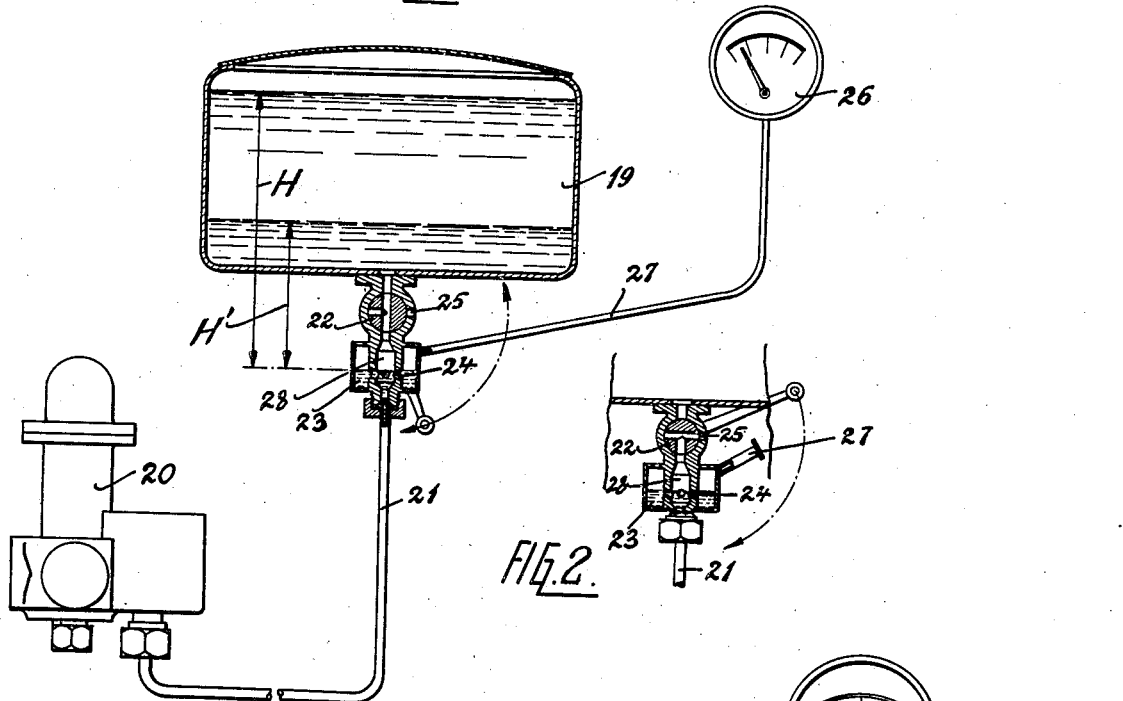
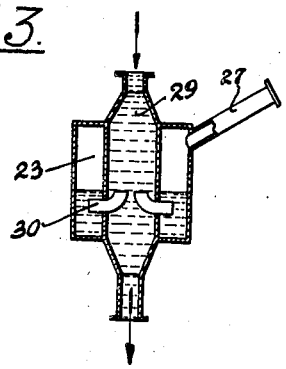
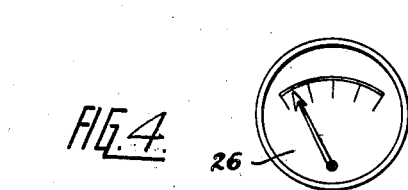
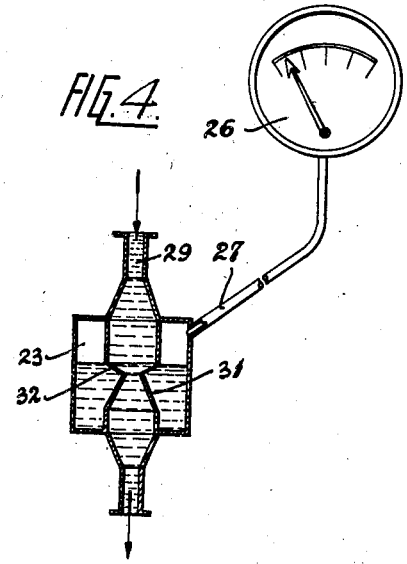
Inventor:
Johannes Paproth
by *Kunishattie*
Atty.

Patented Apr. 28, 1931

1,802,670

UNITED STATES PATENT OFFICE

JOHANNES PAPROTH, OF BERLIN-WILMERSDORF, GERMANY

LEVEL INDICATOR FOR LIQUID TANKS

Application filed September 18, 1926, Serial No. 136,307, and in Germany September 30, 1925.

My invention relates to gravity fuel supply plants for internal combustion engines, and more especially to level indicators for fuel tanks, that is, to devices for indicating the quantity of petrol or other liquid which is carried in a tank. It is an object of my invention to provide an indicator of this type which is particularly adapted to be used in connection with motor vehicles, as the contents of the petrol tank are indicated directly, that is, without the necessity of performing calculations which would interfere with the normal duties of the driver, and such indication may be displayed at any suitable point, for instance, on the dash board of a motor car.

In indicators of this kind as heretofore designed and in which a pressure gauge is connected to the delivery pipe, the liquid level in the tank is indicated by ascertaining the sum of the hydrostatic and hydrodynamic pressures in the delivery pipe, the hydrodynamic pressure in the delivery pipe being known and the liquid level being found by subtraction from the above sum of pressures. When liquid is flowing in a pipe having a branch pipe it is known that the flow exerts suction on the branch pipe and this is termed the "hydrodynamic pressure." A pressure gauge connected to the branch pipe will indicate the hydrostatic pressure when the liquid is at rest but when the liquid is flowing it will indicate a smaller pressure, that is, the hydrostatic pressure minus the hydrodynamic pressure. The hydrodynamic pressure is proportional to the square of the flow velocity. Indicators of the type referred to, however, cannot be used for motor vehicles because the driver, as stated, must not be expected to perform calculations for ascertaining his supply of fuel.

This drawback is overcome in my invention by direct reading. In the gravity plant to which my invention relates, the motion of the liquid is continuous and the indications of the gauge may be read continuously.

According to my invention, I provide an air vessel in, or in connection with, the pipe line intermediate the fuel tank and the carburetor. The vessel eliminates the influence of the considerable variations in the velocity of flow of the fuel by preventing undue reduction of pressure in the pipe line of the pressure gauge. The air vessel also serves for eliminating the influence of hydrodynamic forces.

In the drawings affixed to this specification and forming part thereof a plant embodying my invention is illustrated diagrammatically by way of example.

In the drawings—

Fig. 1 is an elevation, partly in section, showing a plant, according to my invention.

Fig. 2 is a sectional elevation of the three-way valve of the indicator showing the valve in another position.

Figs. 3 and 4 are sectional elevations illustrating various air vessels for the plant illustrated in Figs. 1 and 2.

19 is a gravity tank which is connected with the carburetor 20 through a pipe line 21. A three-way valve 22 is arranged below the tank 19 and an air vessel 23 is inserted between the valve and the pipe 21, the pipe being connected with the vessel by perforations 24. The three-way valve makes connection with the tank 19 and the pipe line 21 in the position indicated in Fig. 1 and, when turned through an angle of 90° as shown in Fig. 2, admits air to the pipe 21 through its main port and a vent hole 25 in the wall of the valve casing. The air vessel 23 is connected with the pressure gauge 26 through a pipe 27. The three-way valve 22 is provided for discharging liquid from the air vessel 23 if a leakage occurs anywhere in the system, for instance at the diaphragm of the gauge 26. Such leakage allows the fuel to rise in the air vessel 23 under the head in the tank 19. In order to remove this excess fuel, the valve 22 is placed in the position shown in Fig. 2. The connection of the gravity tank 19 with the air vessel 23 is now interrupted and the air vessel is connected with the atmosphere through the port 25 in the valve casing which registers with the short bore in the valve 22. Fuel from the gravity tank no longer flows to the air vessel 23 while the fuel in the air vessel is allowed to flow down in the discharge pipe 21 until its level is in line with the ports 24. If the valve 22 has been replaced in its normal position as shown in Fig. 1, and the pressure increases slightly as compared with the last reading, this indicates that there is still a leakage in the pipe line 21 and the reading of the gauge 26 should be increased for the variation in the indications as long as the leakage exists.

When the valve 22 is in the position illustrated in Fig. 1 the pressure in the pipe 21 is transmitted to the vessel 23 through the holes 24, and indicated at the gauge 26. The inside diameter of the pipe line from the carbureter 20 to the tank 19 is increased at 28 within the air vessel 23 and this reduces the hydrodynamic pressure in the pipe line so that it becomes practically nil. It will be understood that the portion 28 of increased diameter may be arranged in a higher or lower position than that indicated in Fig. 1. The diameter of the bore in the valve 22 may be equal to that of the extension 28. In any case the gauge 26 will indicate directly and correctly the liquid levels in the tank corresponding to the heads H and H' which are indicated by way of example. By increasing the inside diameter of the pipe as described the flow velocity in the extended portion is reduced and therefore the influence of the hydrodynamic pressure as defined above, is negligible. Consequently, the indications of the pressure gauge will not vary to an appreciable extent when the liquid is at rest and when it is flowing.

Other means for eliminating the influence of the hydrodynamic pressures and consequent errors are indicated in Figs. 3 and 4.

Referring first to Fig. 3, 23 is the air vessel and 27 is its connection to the gauge 26 which is not shown in this figure. An extended pipe 29 is inserted in the air vessel 23 and backing-up pipes 30 are inserted in this pipe and bent at right angles so that their horizontal ends extend into the air vessel 23 and their vertical ends are connected with the inside of the extension 29. With the inner ends of the pipes 30 in the direction of the flow in the enlarged part of the pipe, hydrodynamic pressure, that is, a reduction of the hydrostatic pressure as explained, cannot occur.

Referring now to Fig. 4, corresponding parts have been indicated by the same reference numerals as in Fig. 3. In this case, instead of the pipes 30, the extended portion 29 of the pipe line is recessed at 31 and perforated at 32 above its smallest area. In this manner, the hydrodynamic pressure is absorbed similarly as described with reference to Fig. 3.

I wish it to be understood that I do not desire to be limited to the exact details of construction shown and described for obvious modifications will occur to a person skilled in the art.

I claim:—

1. A gravity fuel supply plant for internal combustion engines comprising a gravity tank, a discharge pipe connecting said tank with the carbureter of the engine, an air vessel arranged below said gravity tank and connected with said discharge pipe, the discharge pipe having means to establish communication between the air vessel and the discharge pipe, a pressure gauge, a conduit connecting said pressure gauge with the upper part of said air vessel, and a three-way valve between said gravity tank and said air vessel having passages adapted to connect said tank with said discharge pipe, or said air vessel with atmosphere or to disconnect said pipe from said gravity tank and said air vessel from atmosphere.

2. A gravity fuel supply plant for internal combustion engines comprising a gravity tank, a discharge pipe connecting said tank with the carbureter of the engine, an air vessel arranged below said gravity tank and connected with said discharge pipe, the discharge pipe having means to establish communication between the air vessel and the discharge pipe, a pressure gauge, a conduit connecting said pressure gauge with the upper part of said air vessel, said discharge pipe having a portion with an enlarged cross-sectional area in that portion which is connected with the air vessel.

3. A gravity fuel supply plant for internal combustion engines comprising a gravity tank, a discharge pipe connecting said tank with the carbureter of the engine, an air vessel arranged below said gravity tank and connected with said discharge pipe, the discharge pipe having means to establish communication between the air vessel and the discharge pipe, a pressure gauge, a conduit connecting said pressure gauge with the upper part of said air vessel, said discharge pipe having a portion with an enlarged cross-sectional area in that portion which is connected with the air vessel and a branch pipe inserted in said discharge pipe at the portion with an enlarged cross-sectional area extending with the inlet end of said pipe disposed transversely to the flow of liquid and projecting into the liquid in the lower part of said air vessel.

4. A gravity fuel supply plant for internal combustion engines comprising a gravity tank, a discharge pipe connecting said tank with the carbureter of the engine, an air vessel arranged below said gravity tank and connected with said discharge pipe, the discharge pipe having means to establish communication between the air vessel and the discharge pipe, a pressure gauge, a conduit connecting said pressure gauge with the upper part of said air vessel, means for closing said discharge pipe, and means combined with said closing means for connecting said discharge pipe with the atmosphere.

5. A gravity fuel supply plant for internal combustion engines comprising a gravity tank, a discharge pipe connecting said tank with the carbureter of the engine, an air vessel arranged below said gravity tank and connected with said discharge pipe, the discharge pipe having means to establish communication between the air vessel and the discharge pipe, a pressure gauge, a conduit connecting said pressure gauge with the upper part of said air vessel, means for closing said discharge pipe, means combined with said closing means for connecting said discharge pipe with the atmosphere, and means for operating said closing means and said means combined therewith in unison and in such manner that said last-mentioned means connects said discharge pipe with the atmosphere after said closing means has been closed, and the connection is broken before said closing means is opened.

In testimony whereof I affix my signature.

JOHANNES PAPROTH.